Figure 1:
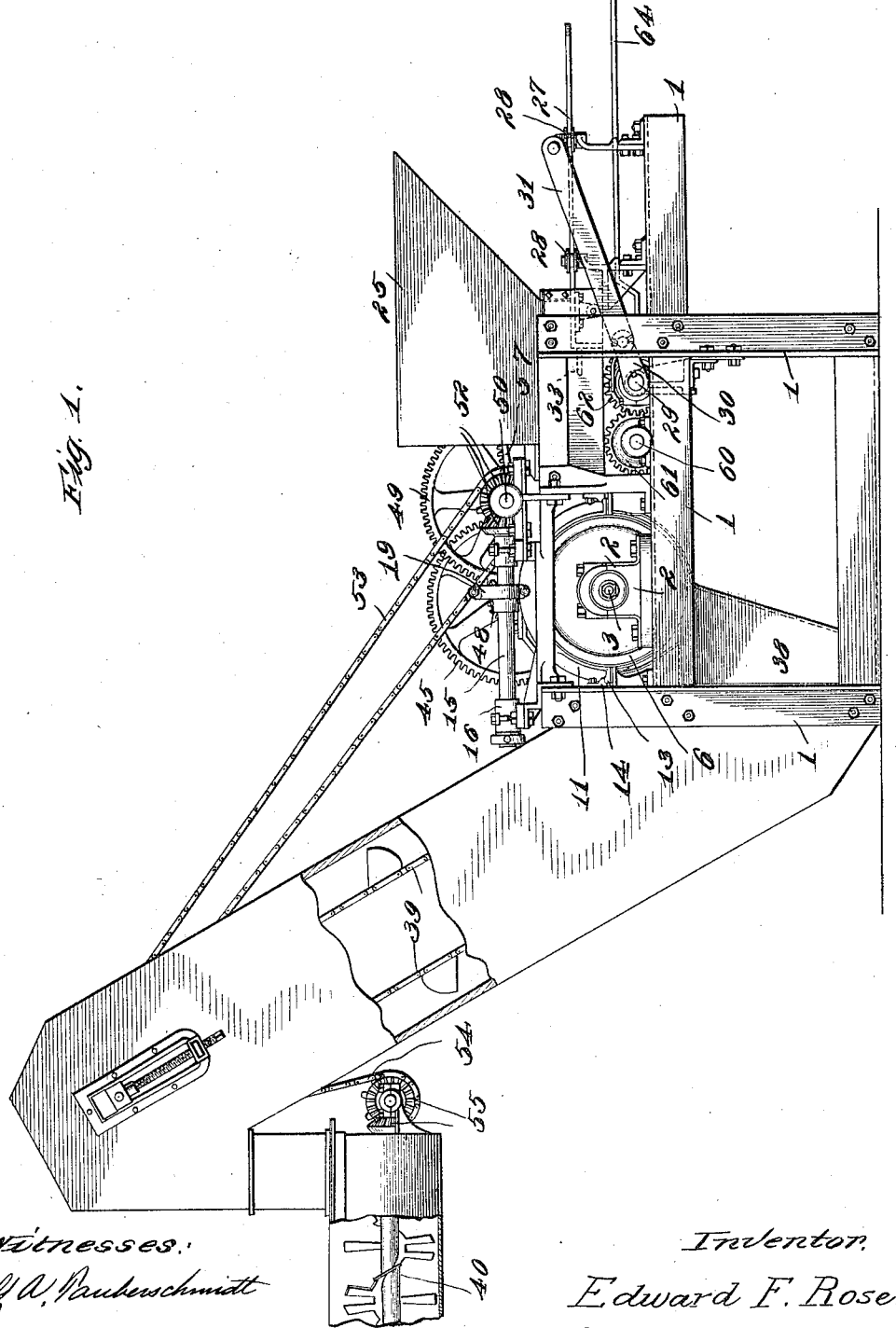

E. F. ROSE.
ALFALFA MILL.
APPLICATION FILED AUG. 6, 1910.

1,181,255.

Patented May 2, 1916.
4 SHEETS—SHEET 1.

Witnesses:
G. A. Paukenschmidt
C. Paul Parker.

Inventor,
Edward F. Rose.
By Luther L. Miller,
Atty

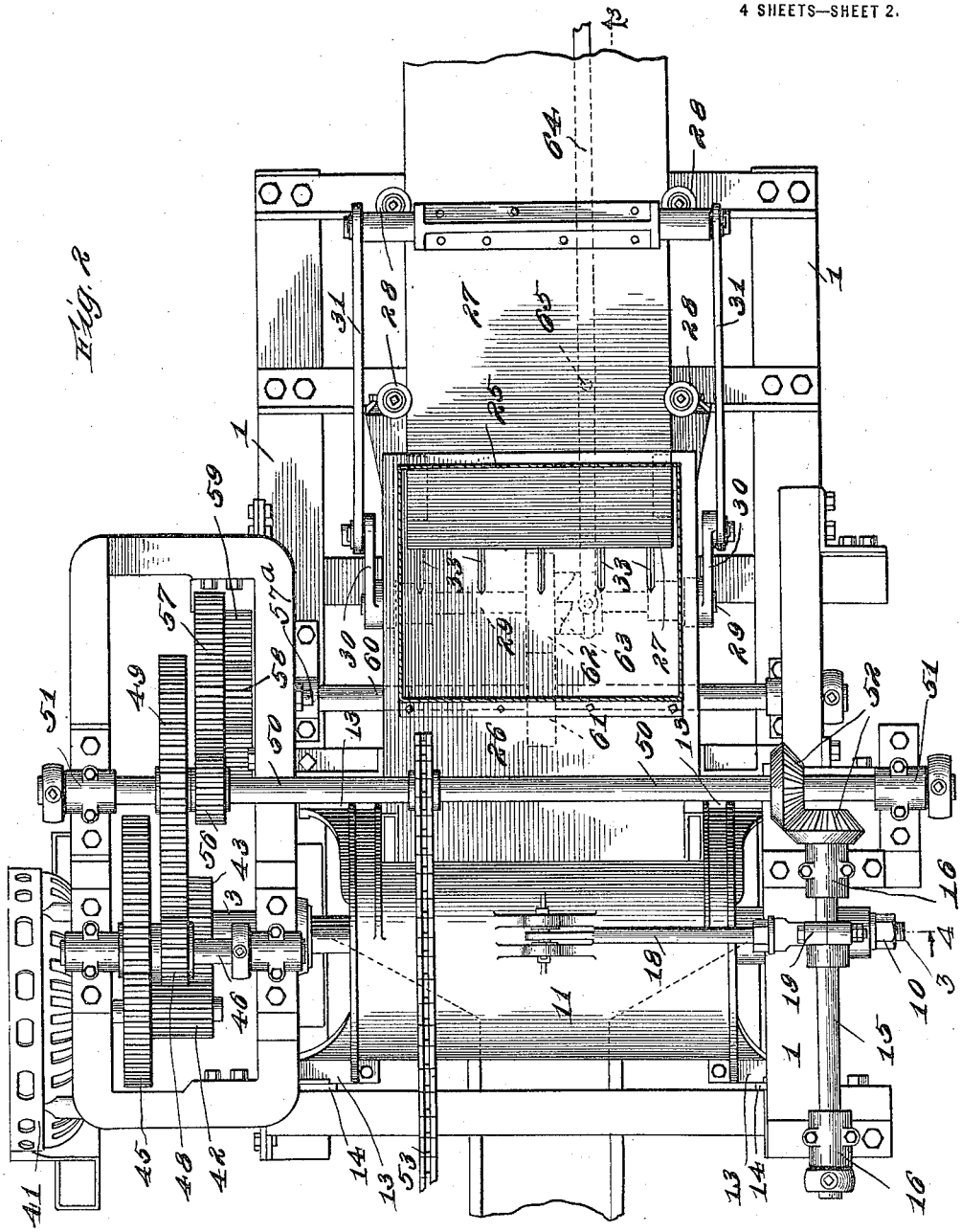

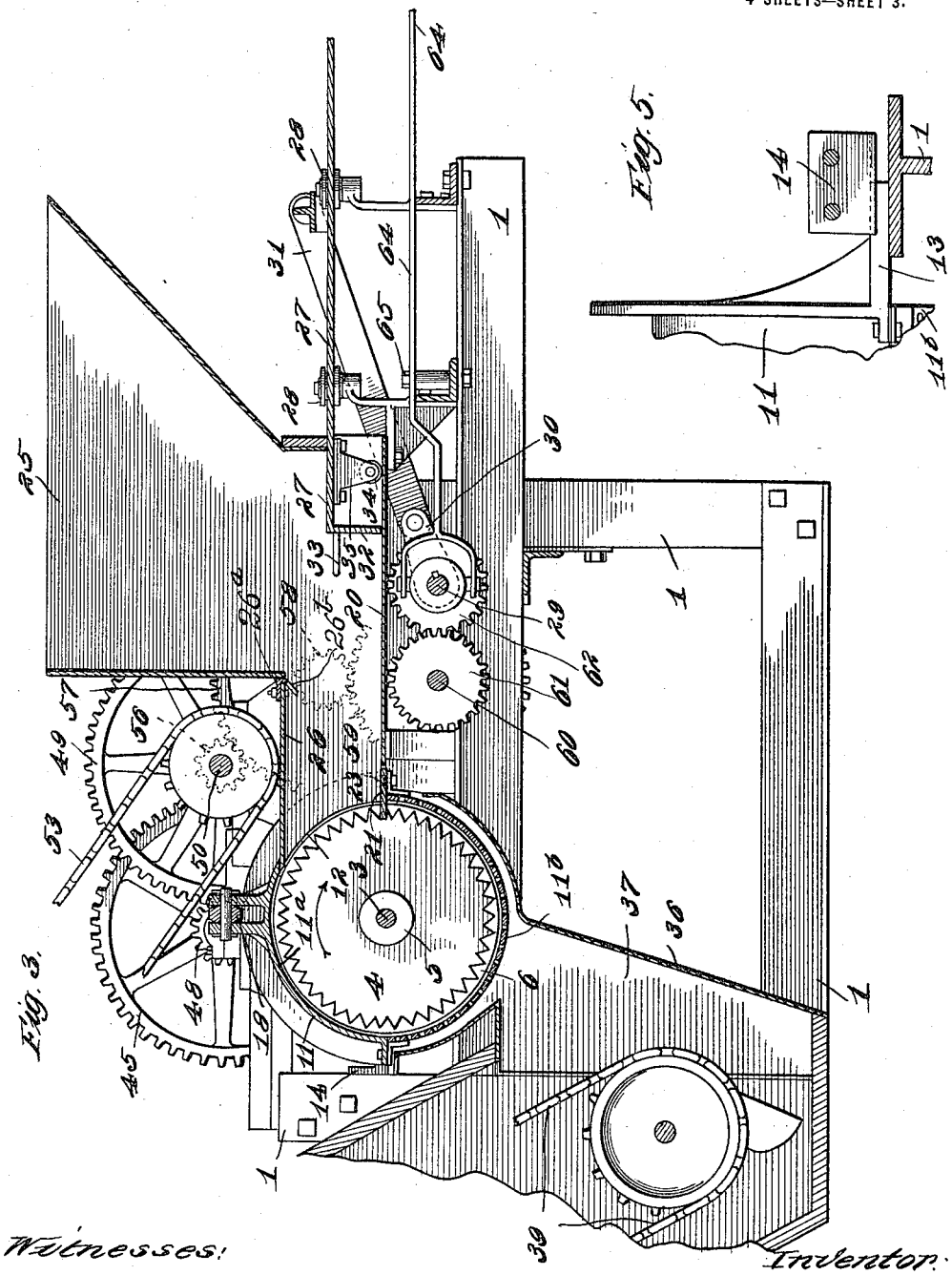

E. F. ROSE.
ALFALFA MILL.
APPLICATION FILED AUG. 6, 1910.
1,181,255.
Patented May 2, 1916.
4 SHEETS—SHEET 4.
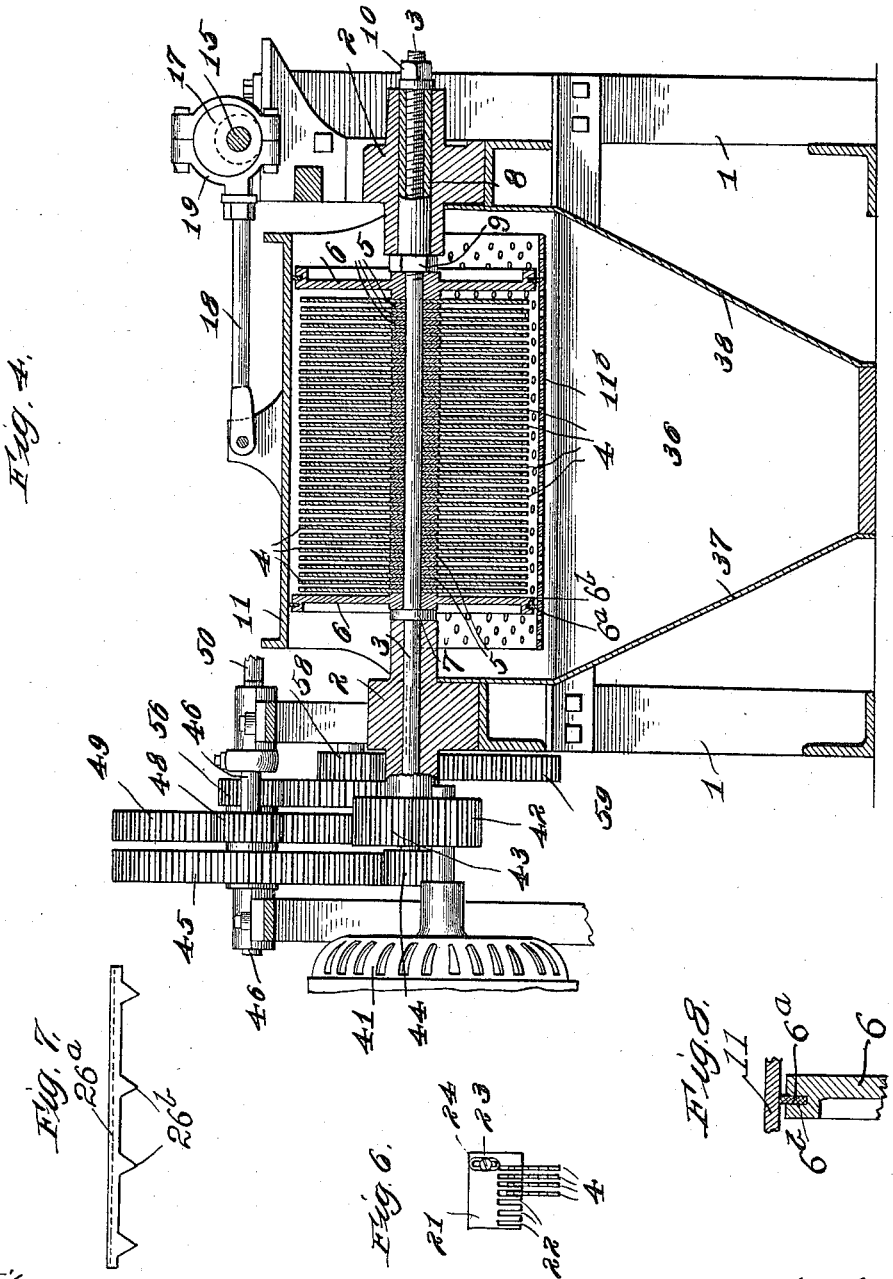
Witnesses:
G. A. Rauberschmidt
C. Paul Parker
Inventor:
Edward F. Rose.
By Luther L. Miller
Atty

UNITED STATES PATENT OFFICE.

EDWARD F. ROSE, OF FORT COLLINS, COLORADO, ASSIGNOR TO KANSAS CITY FEED COMPANY, LIMITED, OF PRESCOTT, ARIZONA, A CORPORATION OF ARIZONA.

ALFALFA-MILL.

1,181,255.          Specification of Letters Patent.          Patented May 2, 1916.

Application filed August 6, 1910. Serial No. 575,871.

*To all whom it may concern:*

Be it known that I, EDWARD F. ROSE, a citizen of the United States, residing at Fort Collins, in the county of Larimer and State of Colorado, have invented certain new and useful Improvements in Alfalfa-Mills, of which the following is a specification.

The object of this invention is to produce a mill for reducing alfalfa hay into suitable form for use as feed for live stock. Such feed should contain as small a quantity as possible of powdered material, and it is one of the objects of this invention to produce a mill adapted to reduce the stems of alfalfa hay to fragments of suitable size without reducing more than a negligible portion of the leaves to powder.

A further object is to provide a mill of this character which shall be particularly adapted for use by cattle feeders.

In the accompanying drawings, Figure 1 is a side elevation of an alfalfa mill embodying the features of my invention. Fig. 2 is a fragmental top plan view thereof, the hopper being shown in section. Fig. 3 is a section taken substantially in the plane of dotted line 3 3 of Fig. 2. Fig. 4 is a vertical section in the plane of line 4, Fig. 2. Fig. 5 illustrates a means for guiding a certain reciprocatory shell comprised in the machine. Fig. 6 is a fragmentary plan view of the saws and the stationary plate which coacts therewith. Fig. 7 is an elevation of a holder plate comprised in the feeding mechanism. Fig. 8 is an enlarged sectional detail view through one of the heads at the end of the rotary saws.

That embodiment of my invention which is herein shown comprises a supporting framework 1 in which are bearings 2 that rotatably support a shaft 3. Upon said shaft is mounted a gang of saws 4, said saws being spaced apart by means of washers 5. At each end of the gang of saws is a rotary head 6. The saws, washers, and heads 6 are rigidly clamped together and secured to the shaft 3 by means comprising a shoulder or collar 7 fixed on the shaft, and a sleeve or nut 8 screw-threaded on said shaft and adapted to clamp the saws, washers and heads between itself and the shoulder 7. The sleeve 8 rotates in the bearing 2, and has an enlarged polygonal end 9 adapted to be engaged by a wrench. A jam nut 10 may be employed to lock the elements of the rotary reducing device together.

Surrounding the gang of saws 4 is a cylindrical shell 11 arranged for reciprocation longitudinally of the saws. In the embodiment herein shown, said shell is constructed as follows: The upper half is a casting 11ª having a feeding opening 12 in its forward side. Upon opposite ends of said casting are formed flanges 13 which are slidably mounted within guideways 14 (Fig. 5) provided in the stationary frame of the machine. The lower half of the shell consists of a screen or perforated plate 11ᵇ rigidly secured to the casting 11ª in any suitable way. If desired, strips 6ª of cloth or other fibrous material may be placed in annular grooves 6ᵇ in the periphery of the heads 6, said strips being held by centrifugal force in contact with the shell 11. These strips prevent the escape of any of the air current caused by the rotating saws between the heads 6 and the shell 11, so that substantially all of the air current passes through the perforated plate 11ᵇ for a purpose to be later described.

The shell 11 is reciprocated by means herein shown as consisting of a shaft 15 rotatably supported in bearings 16 in the framework 1 and carrying an eccentric 17, said eccentric being connected to the shell by means of a rod 18 and the eccentric strap 19.

Within the supporting frame 1 is a stationary horizontal table 20, the upper surface of which, in this instance, lies in the plane of the axis of the shaft 3. At the edge of said table adjacent to the saws 4 is a plate 21 notched as at 22 (Figs. 3 and 6) to accommodate the peripheries of said saws and constituting the stationary element of the reducing mechanism. The plate 21 is preferably adjustably secured in position in any suitable manner, as by means of bolts 23 extending through the slots 24 in said plate, the heads of said bolts being counter-sunk in the plate.

A hopper 25, of any suitable form, is stationarily supported in the framework of the machine and communicates at its lower end with the space above the table 20. The space between the rear wall of the hopper and the forward side of the reciprocatory shell 11 is closed by a stationary plate 26.

The material placed in the hopper 25 is fed to the reducing mechanism by a reciprocatory pusher consisting, in this instance, of a slide 27 guided for horizontal reciprocation in any suitable manner, as for example, by means of grooved guide rollers 28 mounted in the frame 1 and engaging the side edges of said slide. The slide 27 is reciprocated by means comprising a shaft 29 provided with crank arms 30 at its opposite ends, said crank arms being connected to the slide 27 by connecting rods 31. At the rear end of said slide is an angular flange 32 extending close to the table 20. Projecting outwardly from said flange are pins 33. The rear end of the slide 27 is supported upon rollers 34 which run upon the table 20, said rollers being carried in brackets 35 secured to the lower side of the slide 27. Carried at the forward side of the plate 26 is a plate 26$^a$ having downwardly-extending teeth 26$^b$ thereon, said teeth engaging in the hay moved forward by the pusher slide 27 and acting as a stripping means to prevent the hay from returning with said slide.

The material discharged through the screen 11$^b$ is guided by the guide walls 36, 37 and 38 to the boot of a bucket conveyer 39 which is herein shown as arranged to discharge into a screw conveyer 40 by means of which the reduced hay is conveyed to the desired point.

The mill may be driven by means of an electric motor 41 (Fig. 2). On the armature shaft of the motor is fixed a pinion 42 which meshes with a gear wheel 43 on the shaft 3. Upon said shaft 3 is a pinion 44 which meshes with a spur gear wheel 45 fixed upon a shaft 46 which is supported in the machine frame. The shaft 46 carries a pinion 48 that meshes with a spur gear wheel 49 fixed upon a shaft 50, said shaft 50 extending across the frame 1 and being rotatably mounted in bearings 51 thereon. The shaft 50 is connected to the eccentric shaft 15 through the medium of bevel gears 52.

The bucket conveyer 39 is driven from the shaft 50 through the medium of a sprocket chain 53, and the screw conveyer 40 may be driven from the drive shaft of the bucket conveyer by means of a sprocket chain 54 and intermeshing gears 55.

On the shaft 50 is fixed a pinion 56 that meshes with a gear wheel 57 which is mounted upon a stub shaft 57$^a$. Fixed with relation to the gear wheel 57 is a pinion 58 that meshes with a spur gear wheel 59 fixed on a shaft 60. The shaft 60 is connected with the pusher actuating shaft 29 by means of intermeshing gears 61 and 62.

In order to permit of stopping and starting the pusher 27 at will, the gear wheel 62 is arranged to be connected to the crank shaft 29 by means of a clutch 63 of any suitable form, said clutch being operable by means of the shifting lever 64 pivoted at 65 and extending to a point within convenient reach of the operator.

In operation, alfalfa hay, either loose or in the form of bales, in the latter case the bale-ties being, of course, removed, is placed in the hopper 25, and the pusher actuated to force the hay to the reducing mechanism. The saws 4 coöperating with the stationary cutter plate 21 reduce the stems of the hay to pieces of the desired size. The stems of the leaves being dry and brittle, the leaves fall from the stems when the hay is subjected to shock. A large portion of the leaves fall from the stems while the hay is being pushed to the saws, by the pusher 27, and the remainder of the leaves drop off the stems while the stems are being acted upon by the saws. The loose leaves are caught by the air current created by the rapidly revolving saws and are drawn through the space between said saws and through the space between the periphery of the saws and the screen 11$^b$, and are discharged by said air current through said screen. The packing 6$^a$ prevents the escape of the air current between the shell 11 and the peripheries of the heads 6 and all of said current is therefore utilized in blowing the leaves and reduced stems through the screen 11$^b$. In thus passing through the machine, some of the leaves are broken but they are not pulverized or reduced to powder.

The diameter, thickness and spacing of the saws, their speed of rotation, the length of stroke of the perforated shell 11 and its rate of movement, the size of the perforations of said shell and the width of the space between said shell and the saws are determined by the capacity desired and the degree of fineness to which the material is to be reduced. I have found that only a negligible portion of the leaves is reduced and that the stems are reduced to pieces about one-fourth of an inch long, when the saws are nine inches in diameter, three-sixty-fourths of an inch in thickness, spaced one-fourth of an inch apart, and driven at the rate of 2400 R. P. M., the shell 11 having 360 one-inch strokes per minute and the perforations being one-fourth of an inch wide.

I claim as my invention:

1. In an alfalfa mill, the combination of reducing mechanism; a table adjacent said reducing mechanism; a hopper positioned above said table and arranged to deliver material thereto; and a reciprocatory slide comprising a plate having a flange at its rear edge extending close to said table; pins projecting from said flange; and grooved rollers adapted to engage the edge of said plate for guiding the same in its reciprocatory movements, said pusher slide being adapted to move the material along said table toward said reducing mechanism.

2. In an alfalfa mill, the combination of a rotary shaft; a gang of cutting devices fixed on said shaft; a head at each end of and rotatable with said gang of cutting devices; a perforated shell surrounding said heads and said gang of cutting devices; and packing material between the peripheries of said heads and said shell.

3. In an alfalfa mill, in combination, a rotary gang of saws; a table extending into operative relation with the forward side of said gang of saws; a hopper above said table; a pusher for pushing hay over said table into contact with the saws; and a reciprocatory shell extending around the lower and rear sides of said gang of saws, the lower portion of said shell being perforated to permit the escape of the reduced material.

4. In an alfalfa mill, the combination of reducing mechanism; a table adjacent said reducing mechanism; a hopper positioned above said table and adapted to direct material thereto; a reciprocating pusher slide adapted to move material along said table toward said reducing mechanism; and stripper teeth positioned above said pusher slide and adapted to prevent material from returning with said slide in its backward movement.

5. In an alfalfa mill, in combination, a hopper to receive the hay, means for reducing the hay, a long and restricted passage leading from said hopper to said reducing mechanism; reciprocatory means arranged to enter part way into said passage for pushing the hay from said hopper into said passage, rearwardly pointing members on said reciprocating means to engage the hay in pushing it into said passage; and rearwardly pointing members on the wall of said passage to engage the hay to prevent retrogression thereof.

EDWARD F. ROSE.

Witnesses:
MATTHEW J. WILLIAMS,
DONALD MOSSMAN.

Copies of this patent may be obtained for five cents each, by addressing the "Commissioner of Patents, Washington, D. C."